Jan. 27, 1953     C. J. STALEGO     2,626,484
METHOD AND APPARATUS FOR FORMING FIBERS
Original Filed March 18, 1946     2 SHEETS—SHEET 2
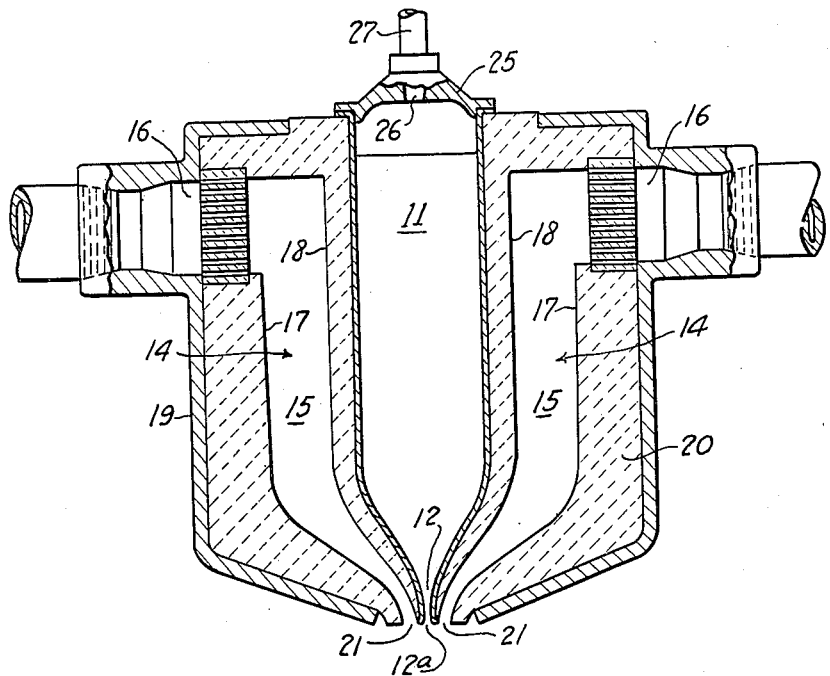
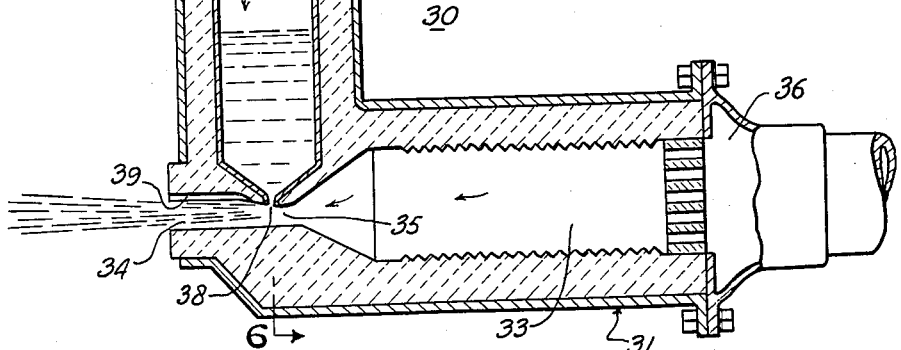
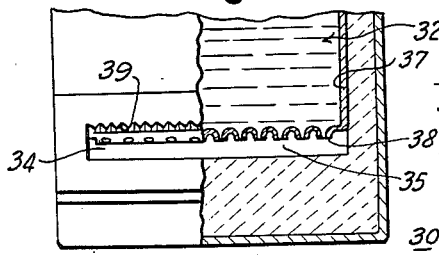
INVENTOR.
Charles J. Stalego
BY
*Stachin & Gullman*
ATTORNEYS Patented Jan. 27, 1953

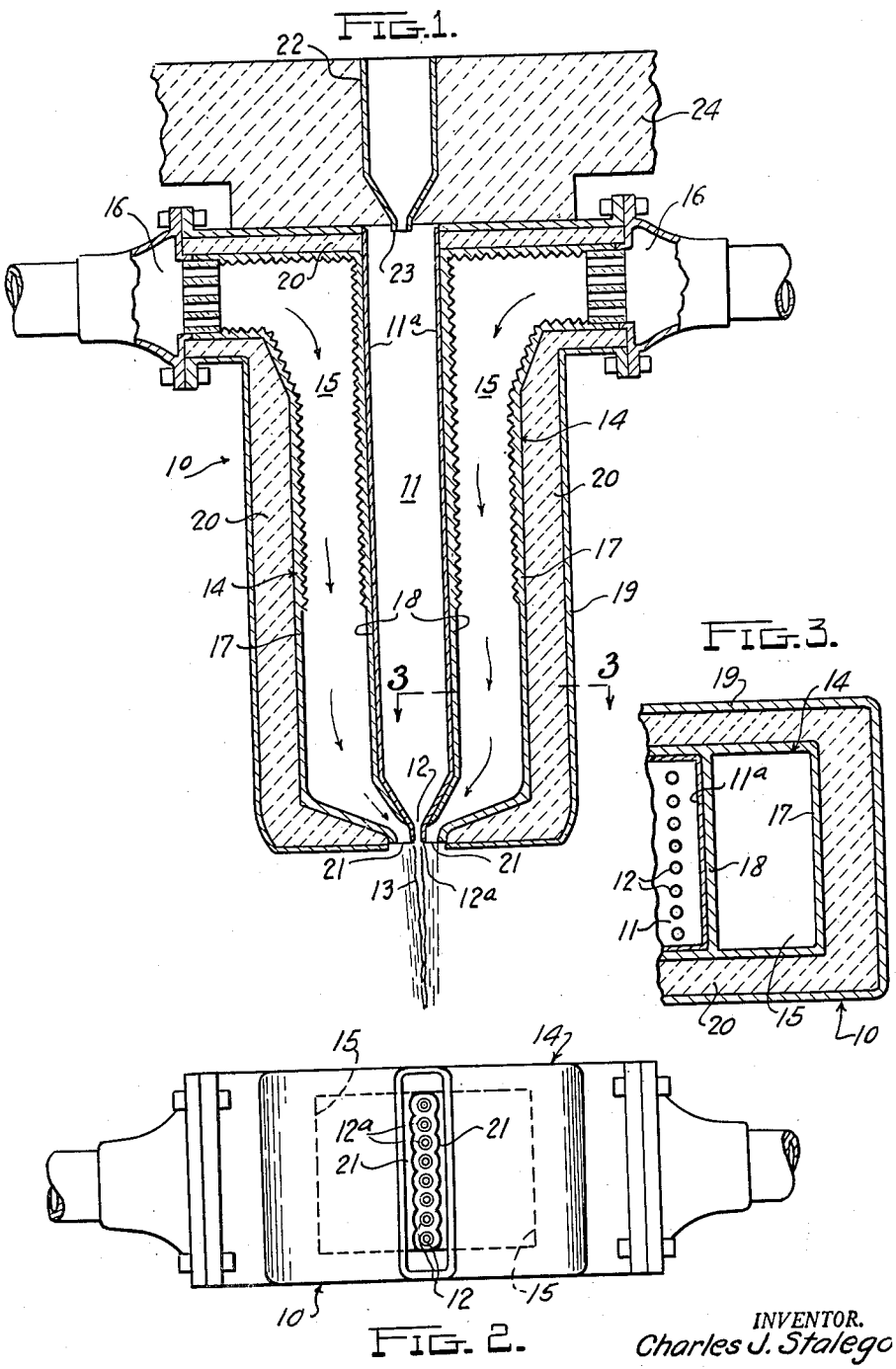

2,626,484

UNITED STATES PATENT OFFICE 2,626,484

METHOD AND APPARATUS FOR FORMING FIBERS

Charles J. Stalego, Newark, Ohio, assignor to Owens-Corning Fiberglas Corporation, a corporation of Delaware Original application March 18, 1946, Serial No. 655,270. Divided and this application August 29, 1951, Serial No. 244,222

11 Claims. (Cl. 49—17)

The present invention relates to an improved method and apparatus for forming fibers from thermoplastic materials such as, for instance, glass and more particularly to a compact apparatus of small size for economically forming glass fibers and is a division of my copending application Serial Number 655,270, filed March 18, 1946, that matured into Patent Number 2,578,100.

Heretofore, glass fibers have been formed by flowing streams of molten glass from a supply body thereof and engaging the streams with a gaseous blast by which the streams are attenuated to fibers. This process when used commercially not only requires a large melting area for the glass but entails the use of much piping for supplying high pressure steam to the blowers and in addition requires electrical equipment for controlling and maintaining proper temperature of the glass. The use of steam or other gaseous medium has a cooling effect on the attenuated fibers which at times is undesirable.

It has been found that much of the apparatus mentioned above can be eliminated and thus provide a fiber forming unit of relatively small size which can be arranged in multiple within a limited space to produce any desired volume of fibers. By employing a high temperature gaseous blast in proximity to the glass the glass can be melted to flowable temperature and streams thereof attenuated by the escape of the high velocity products of combustion.

It is the primary object of the present invention to provide a fiber forming method and apparatus embodying in a single unit a supply body of molten glass which is melted and attenuated by a single source of heat and force, thereby eliminating apparatus heretofore employed.

Another object of this invention is to so arrange the feeder and burner for producing the blast that the products of combustion not only serve to attenuate the streams issuing from the feeder into fine fibers, but in addition, serves to melt or maintain the glass in the feeder to the proper viscosity for efficient fiber forming. More particularly, the invention provides for arranging the feeder and high velocity burner so that one wall of the feeder also forms a wall of the combustion chamber of the burner. As a result, the feeder is in direct heat-conducting relation to the flame in the combustion chamber of the burner and sufficient heat is thereby applied to the contents of the feeder to melt the same.

Still another object of this invention is to support a pair of high velocity burners at opposite sides of the feeder in such a manner that the adjacent walls of the burners form the opposite walls of the feeder.

A further object of this invention is to provide an arrangement of the type set forth in the preceding paragraph wherein the outlet openings for the burners are respectively positioned at opposite sides of the streams of molten material issuing from the feeder and wherein these openings discharge the products of combustion at a velocity sufficient to attenuate the streams into fine fibers.

A still further object of this invention is to direct the streams of molten material from the feeder into a Venturi burner discharge passage in such relationship to the venturi to enable the high velocity blast flowing through the venturi to attenuate the glass into extremely fine fibers.

The foregoing as well as other objects will be made more apparent as this description proceeds, especially when considered in connection with the accompanying drawings, wherein:

Figure 1 is a vertical sectional view through fiber forming equipment embodying the features of this invention;

Figure 2 is a bottom plan view of the construction shown in Figure 1;

Figure 3 is a fragmentary sectional view taken on line 3—3 of Figure 1;

Figure 4 is a vertical sectional view through a modified form of construction;

Figure 5 is a vertical sectional view through still another modification of the present invention, and Figure 6 is a partial front elevational view of the form of invention shown in Figure 5 with parts being shown in section as indicated by the line 6—6 of Figure 5.

Referring first to the embodiment of the invention shown in Figures 1 to 3, it will be noted that the reference character 10 indicates fiber forming apparatus embodying a vertically extending elongated melting chamber 11 adapted to contain a supply of molten thermoplastic material such, for example, as glass. The lower end of the chamber 11 is formed with a plurality of restricted discharge orifices 12 formed in depending tips 12a or nipples through which molten glass flows in the form of streams 13. The walls 11a of the chamber are formed of a material capable of withstanding extremely high temperatures over long periods of use. Particularly satisfactory results have been obtained by forming the walls of the chamber of platinum, although in some cases, molybdenum or other high temperature resistant materials may be used.

Positioned at each side of the chamber 11 is a burner 14 and each burner comprises a combustion chamber 15. The combustion chambers respectively extend for substantially the full area of the opposite side walls of the chamber 11 and are formed with intake ports 16 at the upper ends through which a combustible gaseous mixture is introduced into the combustion chambers. The outer walls 17 of the combustion chambers are formed of a suitable refractory material and the inner walls 18 are formed of a similar material. The inner walls 18 of the combustion chambers form a heat resistant covering for the metal walls of the glass chamber 11 and protect the latter walls from direct contact with the flames produced by the burners. However, the refractory walls 18 embrace the metal walls of the glass chamber 11 and may be considered as part of the latter. In any case, the walls 18 are in direct heat conducting relationship with the metal walls of the glass chamber 11, so that the heat generated in the combustion chambers may be transferred directly to the glass in the chamber 11. The refractory walls 17 of the combustion chambers are supported in a metal casing 19 and are insulated from the casing by a suitable heat resisting refractory 20.

In general, the selected combustible gaseous mixture is introduced into the upper ends of the combustion chambers 15 through the intake ports 16 and, as this mixture burns in the chambers 15, the walls of the latter are heated to extremely high temperatures. As a result, the rate of burning of the gaseous mixture entering the combustion chambers is substantially increased and a high expansion of the products of combustion is thereby obtained. The products of combustion are discharged from each chamber 15 through an outlet port 21, which is restricted to such an extent as to greatly accelerate discharge of the products of combustion and provide a very high velocity blast of intense heat.

Upon reference to Figure 1 of the drawings, it will be noted that the discharge openings 21 are respectively positioned at opposite sides of the outlet orifices 12, so that the blasts of the products of combustion envelop the tips 12a. The blasts converge from opposite sides of the streams of glass 13 issuing from the orifices 12 and are directed in the same general direction as the flow of the streams 13. The velocity of the blast is so great that the streams issuing from the orifices 12 are attenuated thereby to extremely fine fibers.

Owing to the fact that the combustible gaseous mixture is burned in direct heat conducting relation to opposite side walls of the glass chamber 11 throughout the area of these walls, it is possible to melt glass marbles or other glass making materials directly in the chamber 11. This arrangement is advantageous for some applications, because it enables eliminating the usual glass feeder or bushing as well as the conventional primary filament attenuating mechanism. However, in cases where the glass is melted in the chamber 11, it is usually necessary to provide the chamber with sufficient length to secure the time interval necessary to melt the glass to the proper viscosity. In instances where it is desired to employ apparatus with a relatively short chamber, molten glass may be introduced into the upper end of the chamber by a feeder 22 supported above the fiber forming equipment 10. In the present instance, the feeder is diagrammatically shown in Figure 1 as comprising a conventional type of glass furnace having an outlet 23 registering with the upper end of the chamber 11, so that molten glass from the furnace flows directly into the chamber. Insulation 24 surrounding the feeder extends between the bottom of the feeder 22 and the top of the fiber forming equipment 10 in order to prevent air from entering the chamber 11.

Figure 4 illustrates fiber forming equipment similar in construction and operation to the equipment previously described in connection with Figures 1 and 2 of the drawings. Corresponding parts of the two embodiments are indicated by the same reference characters. The fiber forming equipment shown in Figure 4 differs from the equipment previously described in that provision is made for applying pressure to the molten glass in the chamber 11 and thereby facilitates feeding of the streams 13 through the orifices 12. The above may be accomplished by closing the upper end of the chamber 11 with a cap 25 having an opening 26 therethrough for connection to a conduit 27. The conduit 27 is connected to a source of fluid medium under pressure and a pressure regulator (not shown) may be provided in the conduit to enable maintaining pressures in the chamber 11 which are equal to or slightly greater than the pressures developed in the burner combustion chambers. This arrangement assures free flow of molten glass through the orifices regardless of any back pressure that may be applied by the products of combustion discharging from the burners 14.

Figures 5 and 6 of the drawings illustrate a modified form of fiber forming apparatus indicated generally by the reference character 30 and comprising a high velocity combustion chamber type burner 31 in combination with a receptacle 32 or chamber for molten glass. The burner includes a combustion chamber 33 provided with a substantially horizontally disposed, restricted discharge passage 34 formed with a throat or venturi 35. A fuel gas inlet 36 is provided at the opposite end of the chamber 33. The chamber 32 adapted to contain a supply of molten glass is positioned adjacent the venturi in vertical relation to the passage 34. The chamber 32 may well include a metal walled liner 37, provided with a plurality of orifices 38 at the bottom thereof through which molten glass flows directly into the restricted throat of the discharge passage where the velocity of the blast is highest.

The design of the venturi 35 is predetermined to discharge the products of combustion from the burner combustion chamber 33 at an extremely high velocity. Thus, by introducing the molten glass into the Venturi passage, the molten glass is not only blown by the blast into fine glass fibers, but the velocity of the blast creates a suction at the delivery ends of the orifices 38 sufficient to assist the hydrostatic pressure exerted on the molten glass in the chamber to discharge the molten glass into the Venturi passage. The action of the blast flowing across the orifices 38 may be enhanced to some extent by locating the orifices slightly beyond the maximum restriction of the venturi, as clearly shown in Figure 5 of the drawings. It is further pointed out that at least a portion of one wall of the glass chamber 32 forms a part of the combustion chamber, so that the heat generated in the combustion chamber serves to heat the molten glass in the chamber 32 and maintains the glass at the optimum viscosity for fiber formation.

As shown in Figure 6 the upper surface of the discharge passage 34 is provided with serrations 39 which not only increase the incandescent surface area of the passage but provide points from which any unfiberized glass may be attenuated. Normally the fine streams of glass issuing from the orifices 38 are immediately formed into fibers but there may be times when small particles of glass are drawn into contact with the upper surface of the passage due to the turbulent action of the blast after it leaves the throat 35.

What I claim is:

1. The process of producing fibers from mineral material comprising burning a combustible gaseous mixture in a confined zone; discharging the gases of combustion through a passage formed with a restricted area to produce a high velocity blast, and delivering molten mineral material into the passage at the restricted area whereby the mineral material is entrained in the blast and attenuated by the velocity thereof to fibers.

2. The process of producing glass fibers comprising burning a combustible gaseous mixture and discharging the products of combustion through a Venturi passage to produce a high velocity blast, and delivering molten glass into the Venturi passage in the path of the high velocity blast.

3. The process of producing fibers from heat softenable material comprising burning the combustible gaseous mixture in a confined zone; discharging the burned gases through a restricted passage of Venturi configuration in the form of an intensely hot, high velocity blast, and flowing fiber forming material into the restricted passage at the zone of maximum velocity of the gases in the passage whereby the material is attenuated to fibers by the force of the blast.

4. The process of producing fibers from heat softenable fiber forming material including burning a combustible mixture in a confined zone; discharging the products of combustion through a Venturi-shaped passage in the form of a high velocity blast, and feeding a plurality of streams of molten fiber forming material into the passage in a zone of the highest velocity of the blast whereby the streams of molten material are attenuated to fibers by the blast.

5. Apparatus for producing fibers from heat softenable fiber forming material including, in combination, a burner formed with a chamber for burning a combustible mixture in a confined zone; said chamber having a restricted passage of Venturi shape through which the gases of combustion are discharged in the form of a high velocity blast; a receptacle disposed adjacent the chamber and adapted to contain flowable fiber forming material; said receptacle being formed with an orifice in communication with the passage at the zone of the restriction of said Venturi-shaped passage for delivering a stream of fiber forming material into the blast.

6. Apparatus for producing fibers from heat softenable fiber forming material including, in combination, a burner formed with a chamber for burning a combustible mixture in a confined zone; said chamber having a restricted passage of Venturi shape through which the gases of combustion are discharged in the form of a high velocity blast; a receptacle disposed adjacent the chamber and adapted to contain flowable fiber forming material; said receptacle being formed with a plurality of orifices in communication with the passage at the zone of restriction of said Venturi-shaped passage for delivering streams of molten material into the blast, one of the walls of said passage being formed with serrations disposed forwardly of the maximum restriction of the Venturi-shaped passage.

7. Apparatus for producing fibers from heat softenable fiber forming material including, in combination, a burner formed with a chamber for burning a combustible mixture in a confined zone; said chamber having a restricted passage of Venturi shape through which the gases of combustion are discharged in the form of a high velocity blast; a receptacle disposed adjacent the chamber and adapted to contain molten fiber forming material; said receptacle being formed with a plurality of orifices in communication with the passage at a zone adjacent the maximum restriction thereof for delivering streams of molten material from the receptacle into the blast.

8. Apparatus for producing fibers from heat softenable material including, in combination, a burner having a chamber adapted to burn a combustible mixture in a confined zone; said chamber being formed with a discharge passage through which the products of combustion are projected in the form of an intensely hot, high velocity blast; said passage being formed with a restricted throat and outwardly flaring walls, and means including a plurality of orifices in communication with the passage through which fiber forming material is delivered into the zone of the restricted throat of the passage.

9. Apparatus for producing fibers from heat softenable material including, in combination, a burner having a chamber adapted to burn a combustible mixture in a confined zone; said chamber being formed with a discharge passage through which the products of combustion are projected in the form of an intensely hot, high velocity blast; said passage being formed with a restricted throat and outwardly flaring walls; a receptacle adapted to contain fiber forming material; said receptacle having a plurality of orifices in a bottom wall thereof through which streams of molten material are conveyed into the blast; said orifices being disposed adjacent and in communication with the restricted throat portion of the passage; said receptacle being in heat conducting relation with said burner whereby heat generated by the combustion in the chamber is transferred to said receptacle.

10. The process of producing glass fibers comprising establishing a moving stream of gases, directing the gases of the stream through a restricted zone to form a high velocity blast, and delivering fiber-forming material into the restricted zone of the gas stream whereby the material is attenuated to fibers by the velocity of the gases of the blast.

11. The process of producing fibers from heat-softenable fiber-forming material comprising establishing a moving body of gases, directing the gases through a restricted passage to form a high velocity blast, and delivering fiber-forming material into the passage whereby the material is entrained in the gaseous blast and attenuated to fibers by the velocity of the blast.

CHARLES J. STALEGO.

REFERENCES CITED

The following references are of record in the file of this patent:

UNITED STATES PATENTS

| Number | Name | Date |
| --- | --- | --- |
| 2,489,242 | Slayter et al. | Nov. 22, 1949 |
| 2,515,738 | Slayter et al. | July 18, 1950 |